Nov. 25, 1930.       A. H. G. FOKKER         1,782,531
             METHOD AND MEANS FOR FILTERING FLUIDS
                Filed Sept. 27, 1928      2 Sheets-Sheet 2
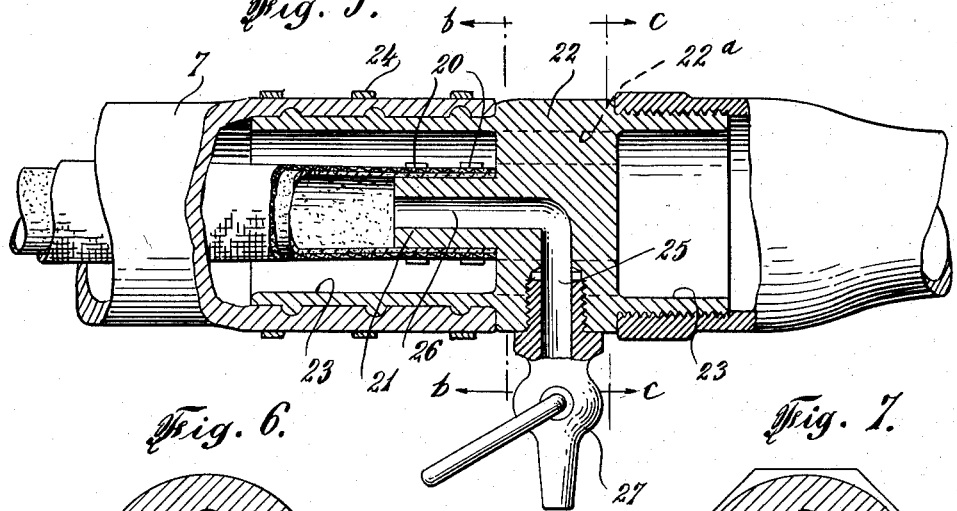
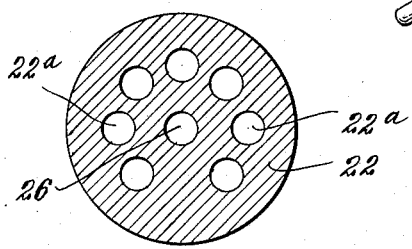
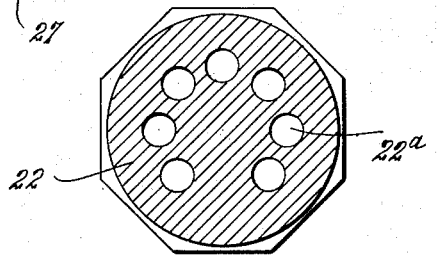
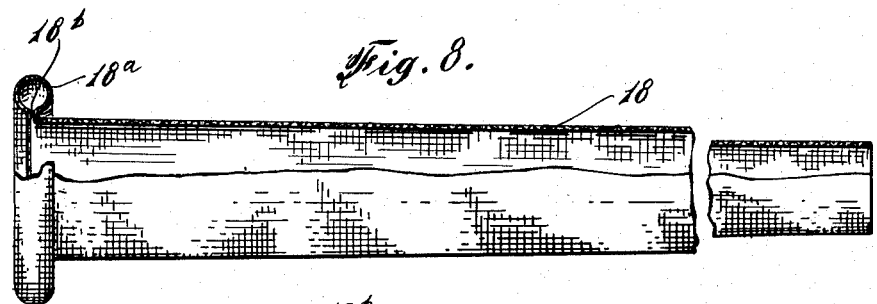
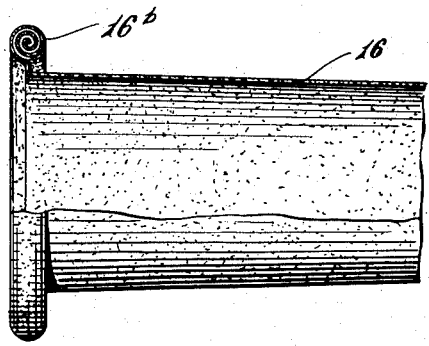
INVENTOR
BY
ATTORNEY Patented Nov. 25, 1930

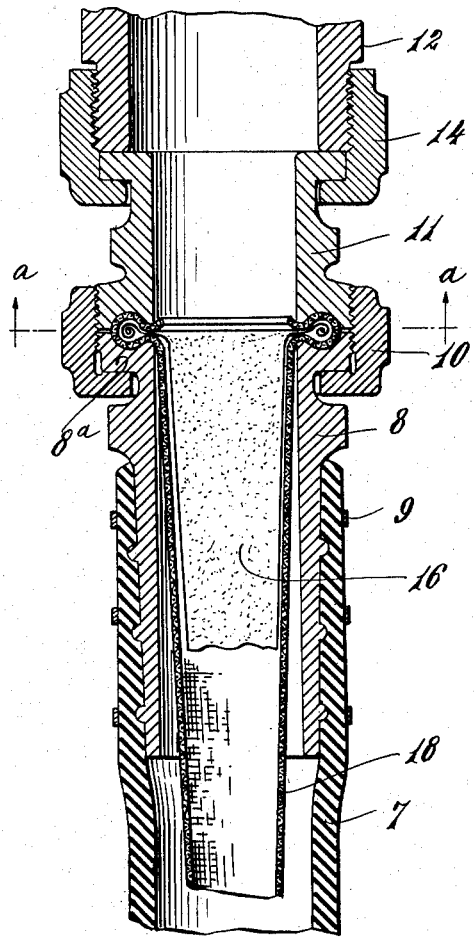
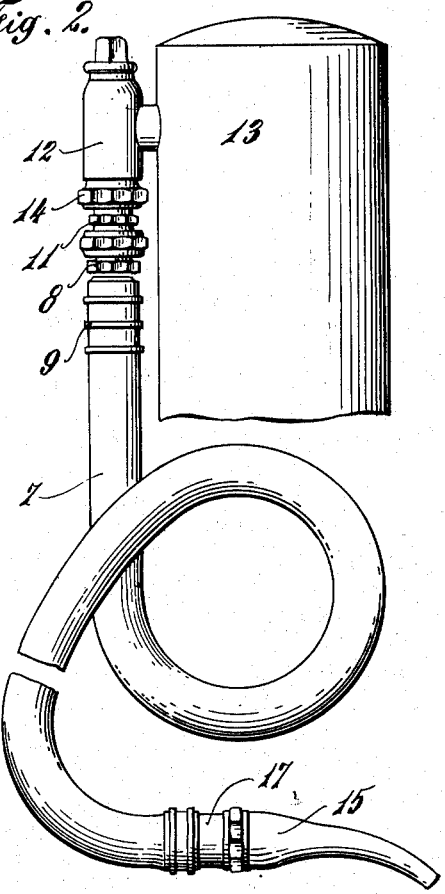
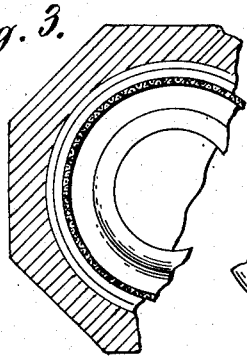
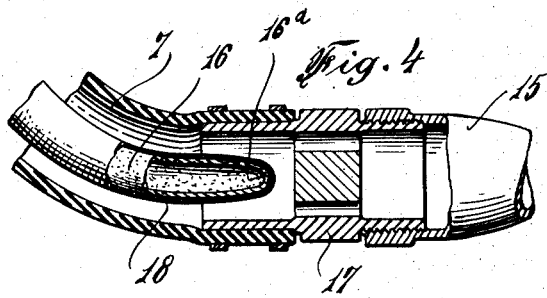
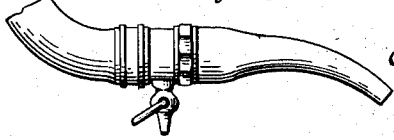

1,782,531

UNITED STATES PATENT OFFICE

ANTHONY H. G. FOKKER, OF AMSTERDAM, NETHERLANDS

METHOD AND MEANS FOR FILTERING FLUIDS

Application filed September 27, 1928. Serial No. 308,814.

The present invention relates generally to filtration, and is more especially directed to a method and means of filtering or straining liquids.

It will be manifest from the following description that my invention has a wide range of usefulness in the handling of liquids of different characteristics and for various purposes. However, in order to present a clear and concise description of my invention, I have elected to confine the present disclosure, more or less, to its application to the filtering of gasoline and similar volatile fluids, after refining and preliminary to their use as a fuel for internal combustion engines.

As is well known, commercial gasoline, as usually supplied for internal combustion engine operation, generally contains impurities and dilutents, such as water, which reduce or impair its efficiency as a fuel. Therefore, where high standards of engine performance are required, as in aircraft operation, for example, it is the present practice to filter or strain the gasoline when filling the engine supply tanks. This is usually done by inserting a filtering material, such as chamois, in the mouth of a funnel, through which the gasoline is poured into the tank, the liquid percolating through the filtering material by gravity. Obviously, this is a slow process at best, and, unless the pump is carefully and slowly manipulated, there is considerable waste, caused by the liquid overflowing the rim of the funnel, resulting in an economic loss.

The general object of the present invention is to provide a simple, economical and efficient method and means for filtering liquids generally, and which will be particularly useful in overcoming the disadvantages inherent to existing methods of filtering gasoline, as previously pointed out.

It is also an object of my invention to provide a simple and efficient means and method of filtering liquid, such as gasoline, during the filling of a fuel supply tank, as in an aircraft or other vehicle, or in the filling of any form of container from a source of supply, through the medium of a pump or other delivery means.

My invention is further directed to the provision of a filtering device which may be used in conjunction with pumping or delivery apparatus of existing designs, without effecting changes therein, as well as for incorporation in especially constructed pumping or delivery mechanisms, so that my invention possesses a wide range of practical utility.

My invention also contemplates an apparatus for practicing my method, wherein the parts are readily interchangeable, so that the apparatus may be quickly adapted to meet different requirements in functioning, means being provided to facilitate cleaning of the apparatus and the removal of any accumulations of sediment therefrom, in order that a high standard of efficiency in operation may be continuously maintained.

More specifically, my invention is directed to the provision of a filtering device which may be removably inserted within the hose of a liquid delivery pump, or in such other outlet or supply line as may be associated with the liquid dispensing medium, through which the liquid is forced under pressure, by the actuation of the pump or the like, and thoroughly cleaned or strained before it issues from the nozzle or mouth of the supply line.

Other objects of my invention, and advantages flowing from the practicing of the same, will doubtless become manifest as the description proceeds, and I would have it understood that I reserve unto myself all rights to the full range of equivalents, both in structure and in use, to which I may be entitled under my invention in its broadest aspect.

In the present drawings, I have elected to show certain preferred means for practicing my invention, but it will be evident that this is merely for illustrative purposes, as my invention may be carried into effect by means and mechanisms other than those shown.

In the drawings:

Figure 1 is a longitudinal section, showing a fragment of hose, the coupling members and the filtering device associated therewith.

Figure 2 is a view in elevation of a part of a conventional pump, with a hose in which my device is inserted, connected thereto.

Figure 3 is a transverse section on the line a—a of Figure 1.

Figure 4 is a longitudinal section of the nozzle end of the hose shown in Figures 1 and 2.

Figure 5 is a longitudinal section of hose embodying a special fitting adjacent the nozzle, to which one end of the filtering element is connected.

Figures 6 and 7 are respectively transverse sections on the lines b—b and c—c of Figure 5.

Figure 8 is a view, partly in section, of the protective covering or retainer for the filter element.

Figure 9 is a fragment, with the wall partly cut away, of the filter element, and Figure 10 is a view in elevation of the nozzle and fitting shown in Figure 5.

Referring now to the drawings in detail, and more especially to the structure shown in Figures 1 to 4 and 8 and 9, in which like characters of reference are employed to designate similar parts in the several views, 7 indicates a hose of the usual construction which is clamped or otherwise fixed to the coupling member 8, as shown at 9. The coupling member 8 carries a nut 10 in engagement with its shoulder $8^a$, whereby said member 8 may be coupled or connected to the cooperating member 11. The latter member, in turn, is detachably connected to the outlet 12 of the pump 13, by means of the nut 14, a continuous passage being thus provided from the pump cylinder to the nozzle 15 connected to the hose fitting or union 17.

In its passage from the pump cylinder 13 to the nozzle 15, from which it is discharged directly into the engine supply tank, the liquid is forced through a filtering element, such as chamois, which is of an elongated conical configuration as indicated at 16 in Figures 1 and 4.

The aforesaid filtering element, which terminates in the closed end $16^a$, adjacent the nozzle 15, may be secured in functioning position within the hose in any suitable or desired manner. In the present showing, I have preferred to employ a protective covering or retainer for the chamois filtering element 16, formed of a flexible, non-corrosive, reticulated wire cloth or fabric which, like the said element 16, is elongated and conical in shape, as shown at 18, conforming substantially to the contour of the outer wall of said element.

The base or annular end of said retainer 18 is preferably reinforced by rolling or forming a bead as shown at $18^a$, the inner perimeter of which is open, as will be clearly evident from Figure 8. This slot or opening $18^b$ permits of distending the bead for the purpose of inserting the bead $16^b$ of the chamois filtering element therein, the latter bead being formed by rolling the fabric upon itself, in the manner shown in Figure 9.

When the filtering element bead is located within the bead of the retainer 18, and the element disposed within the latter, the assembled unit is then connected within the hose or liquid passage and clamped between the coupling members 8 and 11. To accomplish this, the meeting faces of the members 8 and 11 are preferably undercut, as will be seen from Figure 1, to form a seat for the bead $18^a$. By this means, the coupling members may be joined and the filtering element secured in position within the hose by the engagement of the nut 10 with the threads of the member 11.

From the foregoing, it will be seen that as the pump is operated, the liquid is urged or forced through the chamois filtering element, which is distended under the resulting pressure within the limits of the retainer or protective covering 18. Instead of the liquid being confined to a small area for an outlet, as in the case of a strainer within a funnel, it will be manifest that it will pass through the filtering material along its entire length. Consequently, as the element is of considerable length and tapers toward the nozzle end of the hose, there is no restriction upon the normal rate of flow through the hose, and the pump may be actuated with the customary rapidity. Also, there is no possibility of overflow and wastage, as in existing methods, such as heretofore described.

The filtering element may be readily cleaned of any accumulation of sediment or water, by removing it from engagement with the retainer, after the latter has been dismounted by the uncoupling of the members 8 and 11. It will be evident, that several elements of the same dimensions may be kept at hand, so that while one is being cleaned, another may be used in substitution therefor.

In the structure shown in Figures 5, 6, 7 and 10, I have provided means for draining or cleaning the filtering element without removing it from the hose, as is necessary in the preceding arrangement. The base or mouth of the chamois element is fixed within the bead of the retainer and clamped between the coupling members 8 and 11 in the manner previously described. The other end of the tapering element is open and is adapted to be positioned upon and clamped, as at 20, to the centrally disposed nipple 21, projecting from the face of and integral with the wall or partition 22, located intermediate of the ends of the fitting 23. This fitting, which, it will be noted, constitutes a union, is adapted to receive one end of the hose, clamped thereto, as at 24, the nozzle 15 being supported in threaded engagement with the other end thereof as will be seen from Figures 5 and 10.

A bore 25 is provided in the wall or partition 22, which has a right angle extension or continuation 26 through the nipple 21, the outer end of this bore being enlarged and threaded to receive the cock 27. It will be observed that the bore 25 and its extension 26 are in effect a physical continuation of the filtering element, from which accumulations of sediment and water may be forced by the actuation of the pump when the cock 27 is opened. Under normal conditions of operation, the aforesaid cock is closed, the only means of egress for the liquid being through the filtering element, as heretofore described, to the nozzle, the wall or partition 22 being provided with a plurality of radially disposed openings 22$^a$ affording commuication between the hose and nozzle ends of the fitting 23.

While I have described my invention with reference to the specific structures shown, it will be evident that my method may be practiced by other means and that various changes in the details of the media described may be made. For example, the retainer 18 may be composed of a non-stretchable textile which will possess greater flexibility than the wire fabric described, while at the same time preventing undue expansion of the chamois. Likewise other material may be substituted for chamois in the formation of the filtering element, while, in lieu of forming interlocking beads upon the filter element and its cooperating cover, portions of one may be superposed upon the other for clamping between the coupling members or they may be otherwise held in position within the hose. All of such changes are equivalents of the structural features described and with other substitutions and arrangements of the instrumentalities come within the spirit and scope of my invention as defined by the appended claims. This is also true with respect to the different uses to which my invention may be put, it being obviously not my intention to confine my invention to its application to the filtration of gasoline as delivered from, or by, a pump, as heretofore clearly set forth.

I claim:

1. A filtering device for liquid delivering mechanisms, including a hose, a fitting adapted to be connected in said hose said fitting embodying an internal wall having a longitudinal passage merging with an offset passage opening externally of said fitting a plurality of apertures in said wall radially spaced from said longitudinal passage, a filtering element of an elongated configuration connected at one end to said fitting in connection with said bore, a non-stretchable perforate covering conforming to said element, a coupling for removably securing the other end of said element and said covering within the hose at a point adjacent the delivery mechanism and at an appreciable distance from said fitting whereby filtration of the liquid delivered to said hose will be effected substantially throughout its entire length, the liquid passing through said apertures for discharge from the hose.

2. A liquid dispensing apparatus comprising a relatively long flexible hose provided at one end with a rigid coupling member and at the other end with a rigid fitting, a tapering flexible filtering tube of substantially equal length with said hose disposed within said hose and secured at its larger end to said hose by means of said coupling and secured at its smaller end to said fitting, said fitting being provided with means for draining liquid from said hose externally of said filtering tube and with means for draining liquid from said hose internally of said filtering tube.

3. A liquid dispensing apparatus comprising a relatively long flexible hose of uniform cross-section throughout its length provided at one end with a coupling and at its other end with a nozzle fitting, said nozzle fitting being provided with a centrally disposed lug of relatively small diameter having an opening therethrough and with additional openings therethrough external of said lug, a tapering flexible tube composed of filtering material of substantially equal length with said hose disposed within the hose, said tube being secured at its larger end to said coupling and secured at its smaller end to the nozzle fitting lug in open communication therewith, and means for closing or opening the passageway through said lug as desired.

ANTHONY H. G. FOKKER.